United States Patent [19]

Inoue et al.

[11] Patent Number: 5,566,881
[45] Date of Patent: Oct. 22, 1996

[54] AUTOMOTIVE HOT-WATER HEATING APPARATUS

[75] Inventors: Yoshimitsu Inoue, Toyoake; Koichi Ito, Kariya; Hikaru Sugi, Nagoya, all of Japan

[73] Assignee: Nippondenso Co., Ltd., Kariya, Japan

[21] Appl. No.: 520,249

[22] Filed: Aug. 28, 1995

[30] Foreign Application Priority Data

Aug. 29, 1994 [JP] Japan .................................. 6-203692

[51] Int. Cl.$^6$ ...................................................... F24D 3/00
[52] U.S. Cl. .................................. 237/12.3 B; 137/599.1; 165/284
[58] Field of Search ...................... 237/12.3 B; 137/340, 137/599.1, 614.2, 625.29; 165/35–38

[56]  References Cited

U.S. PATENT DOCUMENTS

| | | | |
|---|---|---|---|
| 3,813,035 | 5/1974 | Wobig | 137/599.1 |
| 4,195,777 | 4/1980 | Ikebukuro et al. | 237/12.3 B |
| 4,209,062 | 6/1980 | Woodhullk, Jr. | 165/38 |
| 4,432,410 | 2/1984 | Cadars | 165/35 |
| 4,930,540 | 6/1990 | Oddenino | 137/599.1 |
| 5,107,893 | 4/1992 | Adkins | 137/599.1 |

FOREIGN PATENT DOCUMENTS

| | | |
|---|---|---|
| 61-10327 | 3/1986 | Japan . |
| 4-39614 | 4/1992 | Japan . |

Primary Examiner—William E. Tapolcai
Attorney, Agent, or Firm—Cushman, Darby & Cushman

[57] ABSTRACT

According to the present invention, a hot water type heating apparatus includes a heat exchanger and a flow quantity control valve which controls a quantity of hot water to the heat exchanger. The flow quantity control valve includes a valve housing provided with a first inlet pipe to which the hot water flows, a first outlet pipe which returns hot water to an engine, a second outlet pipe which directs the hot water to the heat exchanger, a second inlet pipe to which the hot water from the heat exchanger flows and a bypass circuit which selectively connects the hot water from the first inlet pipe directly with the first outlet pipe, and a valve body for adjusting an opening area between the first inlet pipe and the second outlet pipe. The first inlet pipe and the first outlet pipe extend from a passenger compartment of a vehicle to an engine room thereof, thereby simplifying the work for connecting these pipes.

24 Claims, 11 Drawing Sheets

AUTOMOTIVE HOT-WATER HEATING APPARATUS

CROSS REFERENCE TO RELATED APPLICATION

The present invention is based on and claims priority from Japanese Application No. 6-203692 filed in Japan on Aug. 29, 1994, the subject matter of which is hereby incorporated herein by reference.

BACKGROUND OF THE INVENTION

1. Field of the Invention

The present invention relates to a hot water type heating apparatus for vehicles, which uses a flow control valve for controlling a flow of hot water.

2. Related Art

A conventional temperature control method for controlling temperature of supply air in an automotive air conditioner including a hot water type heating apparatus, includes controlling the temperature of supply air by controlling the flow of hot water to an heat-exchanger for heating. This method for the controlling flow quantity of hot water has the following advantages as compared to an air-mix type method for controlling temperature of supply air by controlling a mixture ratio between cool air and hot air with an air mix damper.

In the hot water flow quantity control method, a mixture space for mixing cool air and hot air, as in the air-mix type method is not required. Thus, it is possible to reduce the volume of the ventilating duct and reduce ventilating resistance by abolishing the mixture space, thereby reducing electric power and ventilating noise.

As a hot water flow quantity control device, a control valve for controlling the flow quantity of hot water integrated as a unit with a heat-exchanger for heating is disclosed in Japanese Patent Publication No. Sho 61-10327. In this device, a tank is provided at one end of tubes of the heat exchanger for heating to distribute and gather hot water toward the tubes, and another tank is provided at the other end of tubes to make hot water flow around a U-turn.

A control unit is disposed in the tank at the one end of the tubes and includes a hot water flow quantity control valve, hot water bypass circuit, a pressure valve operative in response to pressure for controlling the bypass circuit. Thus, the entire structure of the heating apparatus is simplified.

In this apparatus, all components are disposed in the tank at the one end of the tubes to simplify the structure; however, there are problems in practical use which are explained below.

Since the hot water flow quantity control valve and the pressure valve are disposed in the tank, the heat exchanger should be prepared specially for the individual apparatus. Thus, it is difficult to apply the heat exchanger to various types of apparatus. Specially, it is impossible to commonly apply the heat exchanger to both the hot water flow quantity control type for controlling temperature of supply air by using the hot water flow quantity control valve, and the air mixture type for controlling temperature of supply air by mixture ratio of cool air and hot air without using the hot water flow quantity control valve.

The above conventional apparatus can be applied only to the heat exchanger for heating in which the hot water flows around a U-turn, and cannot be applied to a type of heat exchanger in which the hot water flows in one direction from the one tank to the other tank.

Further, since the hot water flow quantity control valve and the pressure valve are disposed within the tank, it is difficult to maintain these valves.

The present invention is made in view of the above problems, and an object of the present invention is to provide a heating apparatus for vehicles in which a hot water flow quantity control valve integrated as a unit with a bypass circuit is disposed in a hot water pipe portion outside of a heat exchanger for heating.

Another object of the present invention is to provide a heating apparatus for vehicles which is capable of being assembled into a hot water pipe easily when the apparatus is mounted on the vehicle.

SUMMARY OF THE INVENTION

According to the present invention, a hot water type heating apparatus for a vehicle having a water cooled engine is provided. The heating apparatus includes a heat exchanger for heating a passenger compartment of the vehicle by heat exchanging air with hot water supplied from the engine, the heat exchanger having a hot water inlet portion and a hot water outlet portion, and a flow quantity control valve for controlling a quantity of the hot water supplied from the engine to the heat exchanger. The flow quantity control valve is integrated with the heat exchanger as a unit and is in fluid communication therewith. The flow quantity control valve includes a valve housing constructed and arranged to be coupled between the heat exchanger and the engine, a first inlet pipe having one end coupled to the valve housing and another end may be coupled to the engine such that hot water from the engine may flow into the first inlet pipe, a first outlet pipe fluidly connected between the heat exchanger and the engine, one end of the first outlet pipe being connected to the valve housing and the other end connectable to the engine, the first outlet pipe returning hot water to the engine, a second outlet pipe constructed and arranged such that one end thereof being coupled to the heat exchanger, the second outlet pipe directing hot water flowing from the first inlet pipe to the hot water inlet portion of the heat exchanger, a second inlet pipe connected between the valve housing and the heat exchanger, which directs hot water from the hot water outlet portion of the heat exchanger into the valve housing, a bypass circuit defined in the valve housing which selectively connects hot water from the first inlet pipe directly to the first outlet pipe, a valve body disposed in the valve housing between the first inlet pipe and the second outlet pipe and in fluid communication with the bypass circuit, the valve body being constructed and arranged to adjust an opening area between the first inlet pipe and the second outlet pipe while controlling flow through the bypass circuit.

According to the above configuration, the flow quantity control valve, including the bypass circuit therein, is integrated with the heat exchanger and in fluid communication therewith. Thus, the heat exchanger and the flow quantity control valve can be handled as a unit, thereby making it easier to assemble or mount into the vehicle. Further, the flow quantity control valve is not incorporated into the tank of the heat exchanger as in the conventional type. Thus, it is possible to apply the flow quantity control valve to various types of heat exchangers by modifying the flow quantity control valve without modifying the heat exchanger. Therefore, it is possible to apply the heating apparatus even to the type of heat exchanger in which hot water flows around a U-turn or in only one direction from one tank to another tank. Further, it is easy to maintain the flow quantity control valve, because the control valve is mounted on the heat exchanger, but not incorporated into the heat exchanger.

BRIEF DESCRIPTION OF THE DRAWING

Other objects, features and characteristics of the present invention as well as the function of related parts will become clear from a study of the following detailed description, the appended claims, and the drawings. In the accompanying drawings:

DETAILED DESCRIPTION OF THE PREFERRED EMBODIMENTS

Figure 1:
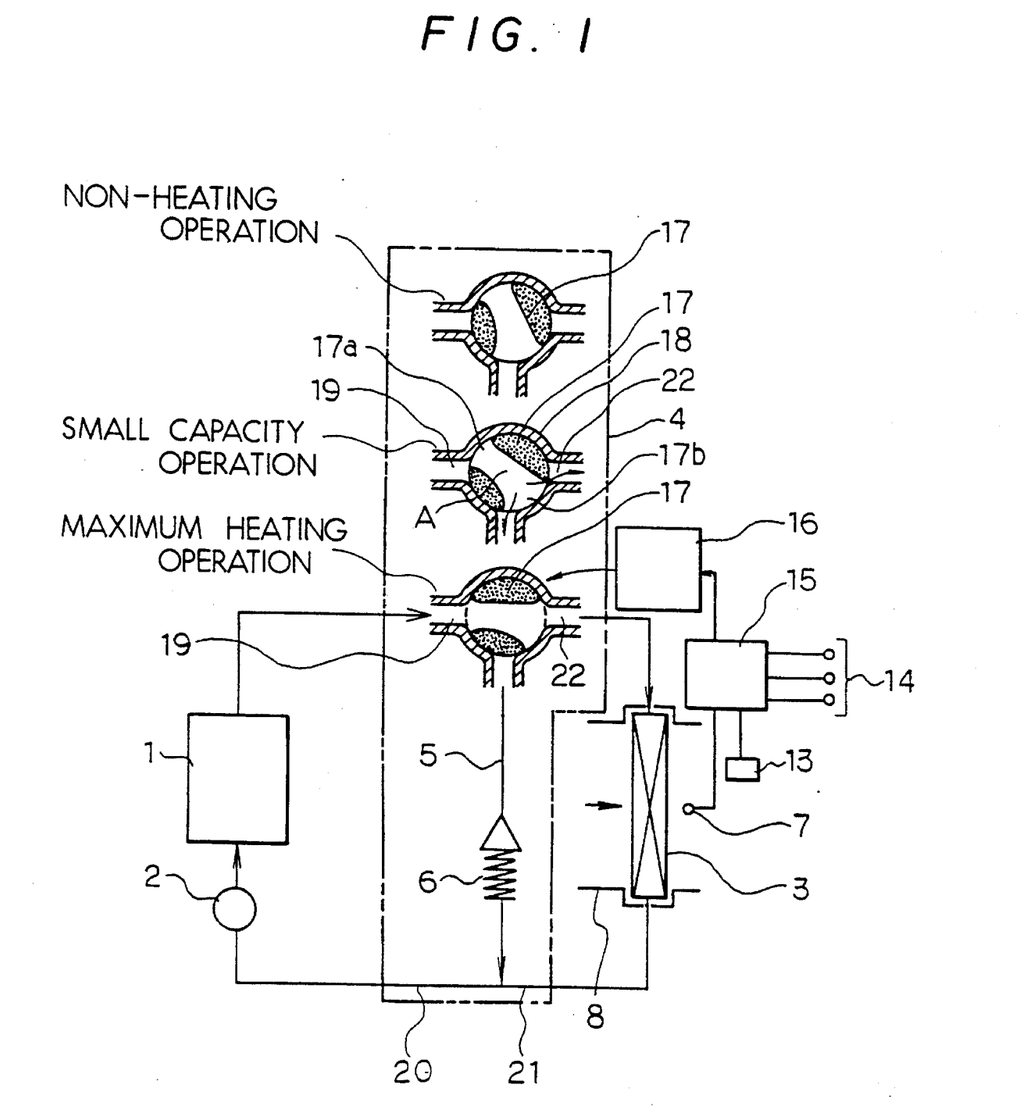
FIG. 1 is a view schematically illustrating a hot water circuit according to a first embodiment of the present invention.

A first embodiment of the present invention is described with respect to FIG. 1. In this embodiment, the present invention is applied to a hot water type heating apparatus of an air conditioner for vehicles. As shown in FIG. 1, water pump 2 is operated by water cooled engine 1 for running the vehicle so that cooling water circulates in a cooling water circuit (hot water circuit) of engine 1. Heat exchanger 3 (heater core) heats ventilating air by heat exchange of hot water supplied from engine 1 with the ventilating air. Flow quantity control valve 4 is a three directional type valve having three inlets and three outlets for hot water. The detail of the structure of control valve 4 will be described later.

Bypass passage 5 is provided in parallel with heat exchanger 3. Differential pressure valve 6 opens when the difference between the front pressure thereon and the back pressure thereon reaches a predetermined value, thereby making the front pressure and the back pressure of heat exchanger 3 get closer in a certain level, even when discharge pressure of water pump 2 fluctuates due to the variation in the rotational speed of engine 1.

Not shown in FIG. 1 concretely, bypass passage 5 and differential pressure valve 6 are incorporated in the flow quantity control valve 4 as a unit. Further, the unit of flow quantity control valve 4 is assembled in heat exchanger 3. The assembling of this structure will also be described later.

Figure 2:
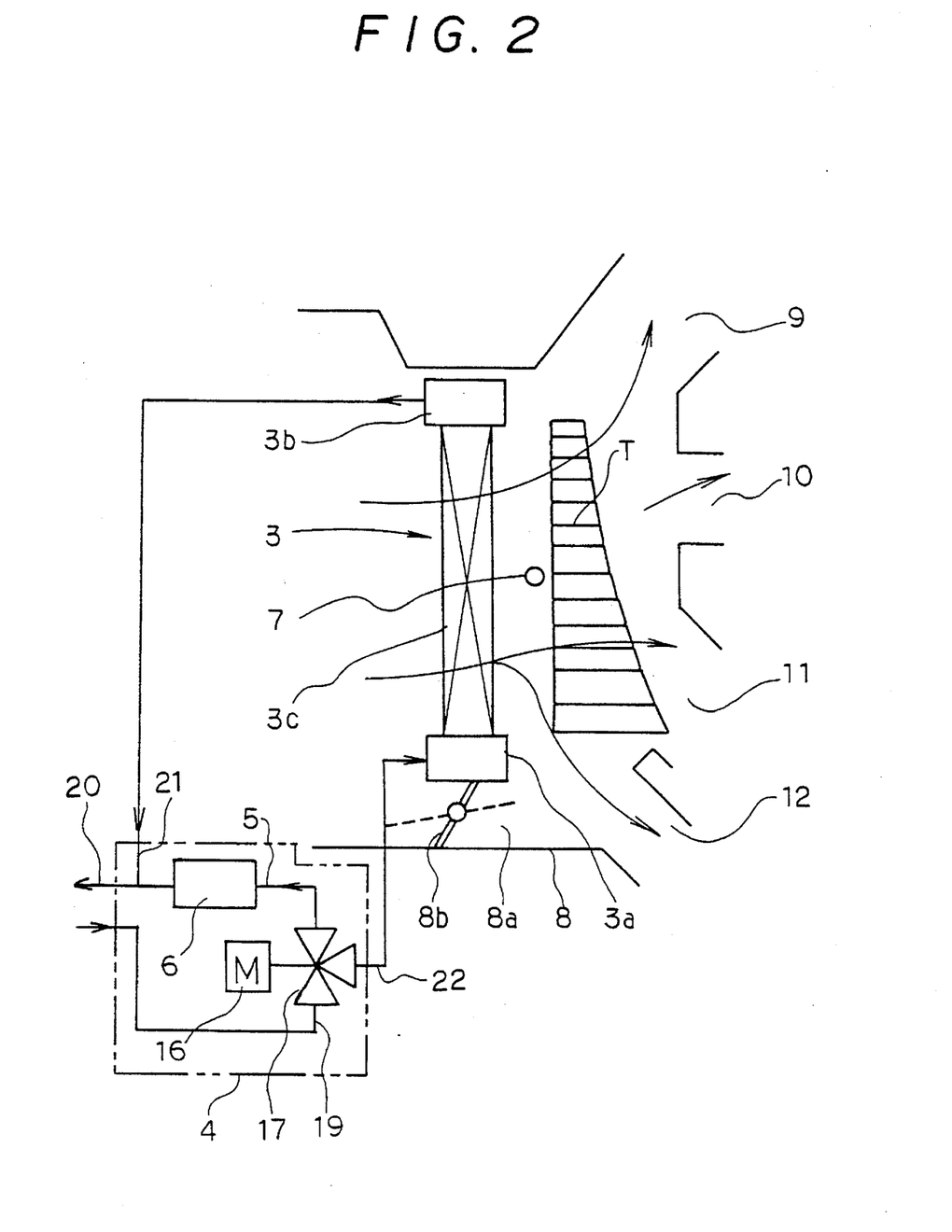
FIG. 2 is a schematic view illustrating a heat exchanger for heating mounted in a ventilating duct of an air conditioner.

As shown in FIG. 2, temperature sensor 7 is disposed in a ventilating duct (heater case) 8 of the air conditioner of the vehicle where heat exchanger 3 is mounted, at the downstream side of heat exchanger 3 and at a portion immediately before the fork of each of air outlets 9–12 to the vehicle passenger compartment. Temperature sensor 7 includes a thermistor and detects the temperature of hot air supplied to the passenger compartment.

In FIG. 2, upper (face) air outlet 9 supplies air towards a face of the passenger disposed in the passenger compartment, defroster air outlet 10 supplies air toward a front windshield glass to remove drops of water on the glass, front foot air outlet 11 supplies air towards the feet of the front passenger, and rear foot air outlet 12 supplies air towards the feet of the rear passenger.

In FIG. 1, temperature setting device 13 sets a target temperature (desired temperature for the passenger) in the passenger compartment and includes a manual switch or a variable resistor operated by the passenger etc. Various types of sensors 14 are provided to detect physical values of environmental factors in relation to temperature control in the passenger compartment, such as outside temperature, hot water temperature, and amount of sunlight. Air conditioning control unit 15 outputs temperature control signals based on input signals from temperature sensor 7, various sensors 14, temperature setting device 13 and so on. Air conditioning control unit 15 includes a micro-computer.

Servomotor 16 is operated in accordance with temperature control signals from the air conditioning control unit 15 and rotates valve body 17 of flow quantity control valve 4 in response thereto. Actuator for actuating flow quantity control valve 4 is not limited to an electrical actuator such as servomotor 16, but a manually operated mechanism using lever, wire, etc. as well-known can be also applied.

Figure 3:
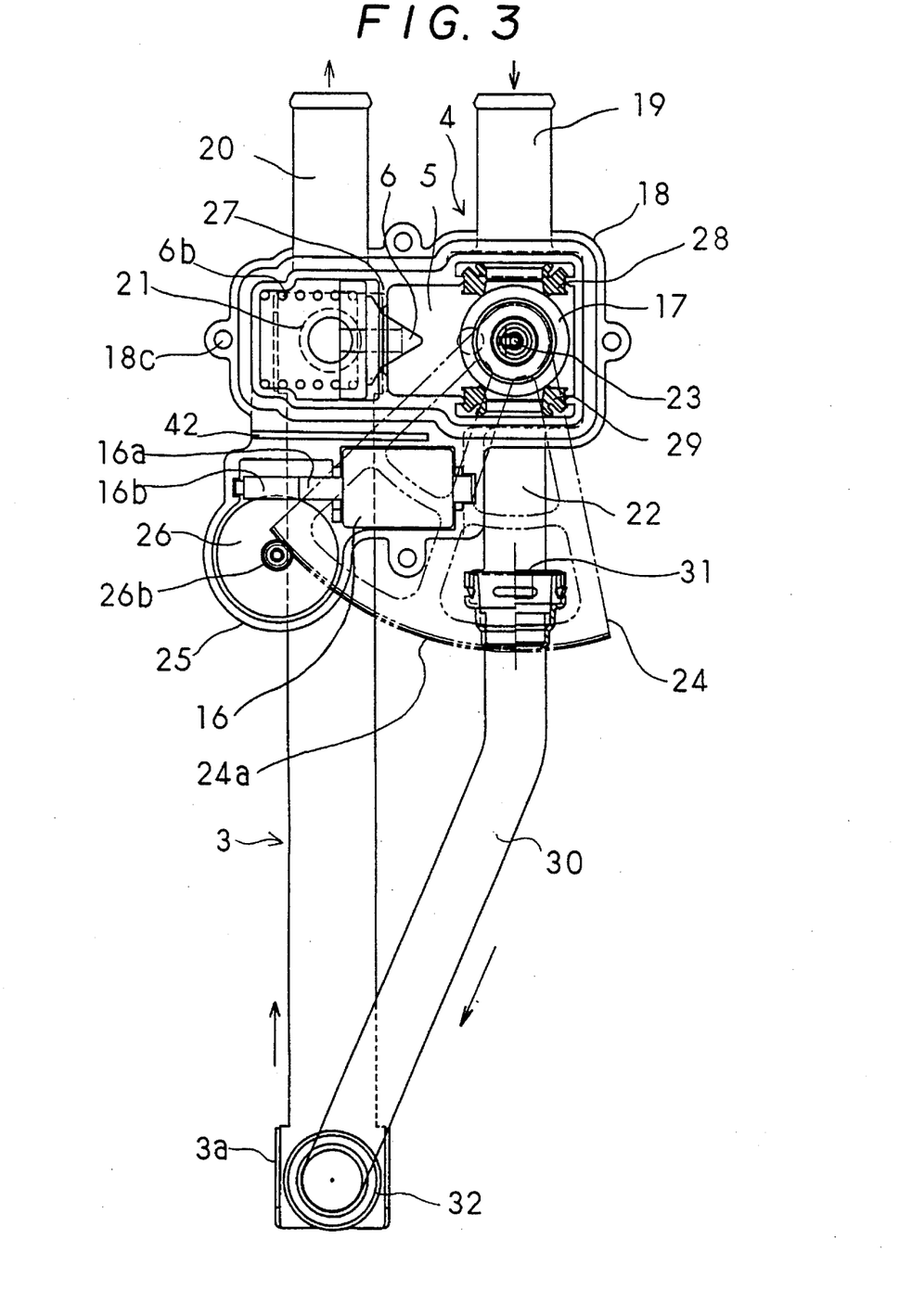
FIG. 3 is a side view, partially in section, where an upper cover of a flow quantity control valve is removed, showing the flow quantity control valve and the heat exchanger for heating assembled as a unit.
Figure 4:
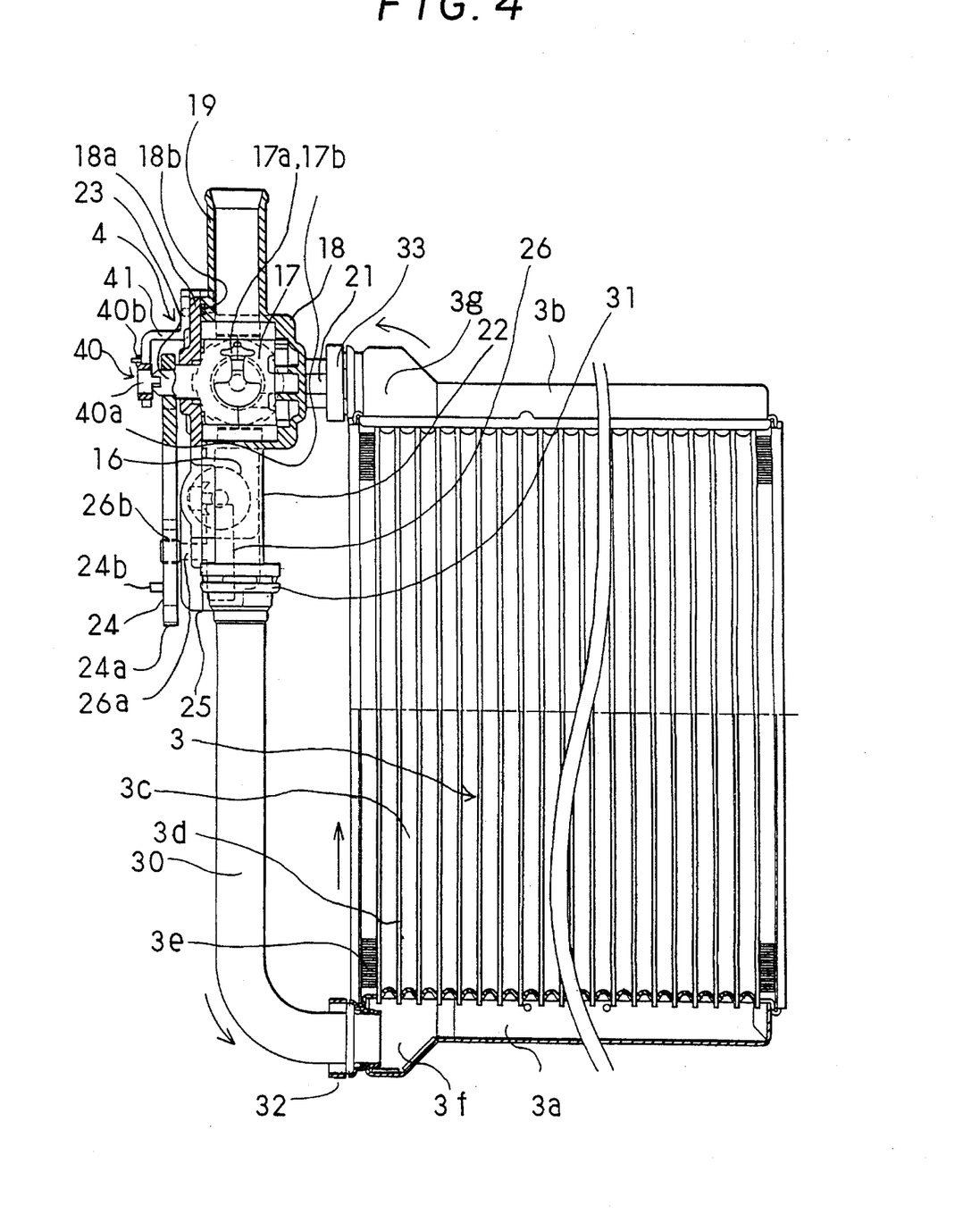
FIG. 4 is a partially cutaway and sectional front view showing the flow quantity control valve and the heat exchanger for heating assembled as a unit.
Figure 5:
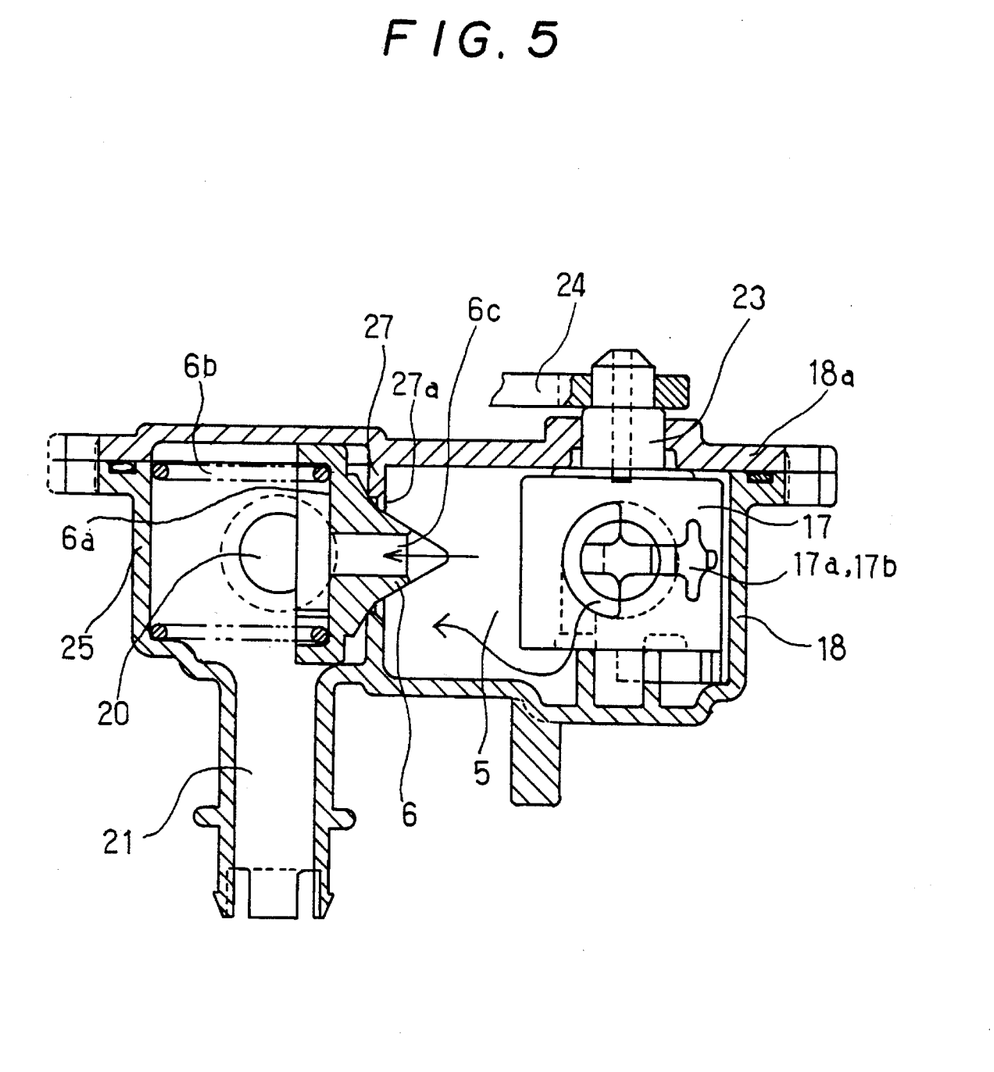
FIG. 5 is a cross-sectional view illustrating the flow quantity control valve.

In FIGS. 3–5, a unitized structure of the flow quantity control valve 4 and heat exchanger 3 is illustrated. Valve body 17 is made of resin material and formed in a cylindrical shape. Valve body 17 is rotatably supported in valve housing 18 made of resin. As shown in FIG. 4, valve body 17 has a cylindrical rotor having an axis extending in a vertical direction.

In valve housing 18, first hot water inlet pipe 19, first hot water outlet pipe 20, second hot water inlet pipe 21 and second hot water outlet pipe 22 are formed as a unit with resin. First hot water inlet pipe 19 is coupled to engine 1, and hot water flows in first hot water inlet pipe 19 from engine 1. First hot water outlet pipe 20 is connected between heat exchanger 3 and engine 1 so as to return hot water to engine 1. Second hot water inlet pipe 21 is connected to heat exchanger 3, and hot water flows in second hot water inlet pipe 21 from heat exchanger 3. Second hot water outlet pipe 22 is coupled to heat exchanger 3 so as to direct hot water from first hot water flowing to heat exchanger 3.

In the valve housing 18, the bypass circuit 5 for bypassing hot water from the first hot water inlet pipe 19 to the first hot water outlet pipe 20 through valve body 17 is formed.

Figure 7:
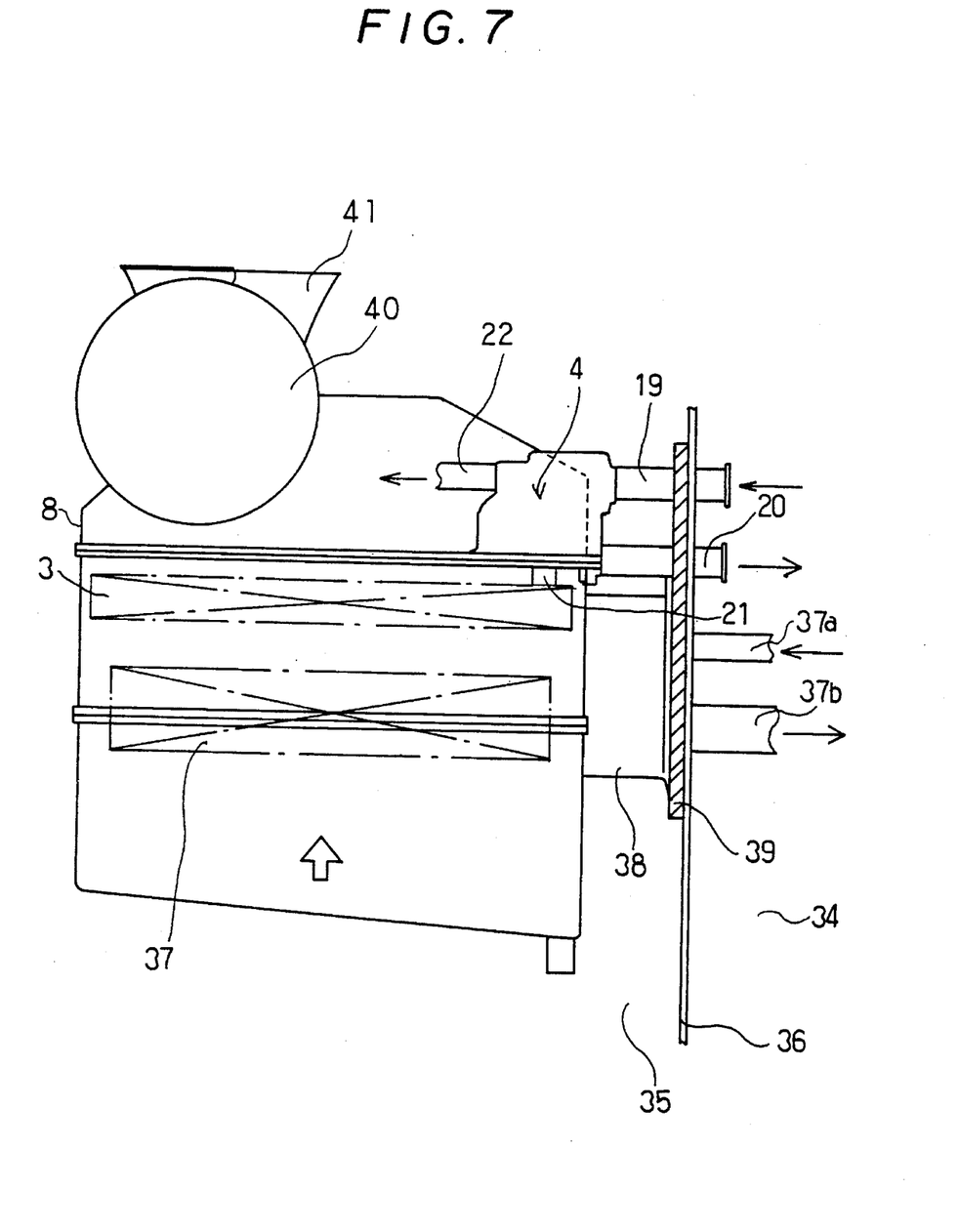
FIG. 7 is a partial sectional view illustrating an air conditioner for a vehicle including a heat exchanger, which is mounted on the vehicle.

In the cylindrical valve housing 18, control passages 17a and 17b for adjusting each opening area of pipes 19, 22 and bypass circuit 5 are formed shown in FIGS. 1 and 7. Each opening area has a correlation with one another, which will be described more fully below. Shaft 23 is connected to valve body 17 as a unit and controlled to rotate valve body 17. An extending end of fan-shaped gear 24 is formed as a cross-sectional shape. Rotating center hole of fan-shaped gear 24 (pivot position of the fan) is fitted in the D-shaped extending end. Shaft 23 and fan-shaped gear 24 rotate together.

In FIG. 4, a round-shaped center movable member 40a of potentiometer (variable resistor) 40 for detecting a rotational position of valve body 17 is connected to the extending end as a unit. Casing 40b of potentiometer 40 is fixed to an upper cover 18a with a bracket 41. A signal for indicating a rotational position of the valve body 17 via the potentiometer 40 is input to the control apparatus 16, and the information is fed back to servomotor 16 so that valve body 17 is positioned at a predetermined position precisely.

Upper cover 18a is detachably fixed to the valve housing 18 by bolts (not shown) so as to hold O-ring 18b therebetween as shown in FIG. 4. In this embodiment, four screw holes 18c, into which the bolts are driven, are provided on valve housing 18.

Valve housing 18 includes an actuating mechanism casing portion 25 which houses a valve body actuating mechanism on the side of the second hot water outlet pipe 22. In this casing portion 25, servomotor 16 including a direct current motor is disposed, and a worm gear 16b is formed on the tip portion of shaft 16a of motor 16.

Worm gear 16b is engaged with flat gear 26 for creating a speed reduction. Flat gear 26 is rotatably supported by a bearing (not shown) provided in valve housing 18. Worm gear 16b formed on shaft 26a of flat gear 26 is engaged with gear portion 24a formed on an outer peripheral portion of fan-shaped gear 24. It is possible to reduce a large amount of speed by a single fan-shaped gear 24 instead of reducing speed step by step with several speed reducing gears.

Long and narrow slit-like groove 42 is provided in the valve housing 18 (resin thick portion), which is located between servomotor 16 and the hot water circuit portion, to form an adiabatic air gap. Thus, heat of valve body 17 in valve housing 18 and the hot water in the hot water circuit portion is prevented from being transferred to the servomotor 16, thereby preventing overheating of servomotor 16.

The actuating mechanism for actuating valve body 17 automatically is configured as described above. The actuating mechanism for actuating valve body 17 is not limited to an electrical actuator such as servomotor 16, but a manually operated mechanism using lever, wire, etc. can also be applied to rotate valve body 17.

In the event a manually operated mechanism is desired, pin 24b is provided on an upper surface of fan-shaped gear 24, made internally therewith from resin (refer to FIG. 4), and a cable (not shown) for manual operation is connected to pin 24b.

Differential pressure valve 6 is disposed in the bypass circuit 5 formed in the valve housing 18. Differential pressure valve 6 is made of resin and is conical (FIG. 5). Coil spring 6b abuts conical portion 6a on a bottom surface of differential pressure valve 6 and applies pressure in a right direction in FIG. 5 (closing direction). Hole 6c is formed at the center portion of the differential pressure valve 6. Thus, when differential pressure valve 6 is in a closed position, a certain amount of hot water flows in bypass circuit 5 via hole 6c.

Valve housing 18 includes partition wall 27, and round-shaped hole 27a is formed at the center thereof to define a valve seat. Differential pressure valve 6 opens and closes upon release and engagement with the valve seat. Round-shaped hole 27a spreads-out toward hot water inlet side as a taper to reduce the resistance of flowing water. Upper half portion of partition wall 18a shown in FIG. 5 is formed as a unit with upper cover 18a, and the lower half portion thereof is formed as a unit with valve housing 18, for releasing consideration during resin forming of these parts.

In FIG. 3, sealing members 28 and 29 are made of elastic material such as rubber and are of rectangular shapes, each of which has an opening at the center thereof. Sealing members 28 and 29 are disposed between the outer peripheral surface of valve body 17 and the inner peripheral surface of valve housing 18. These sealing members 28 and 29 prevent hot water from flowing directly between pipes 19, 22 and bypass circuit 5 without passing through control passages 17a and 17b. In this embodiment, two of each sealing members 28 and 29 are provided for the hot water inlet pipe 19 and a hot water outlet pipe 20, respectively.

Figure 6A:
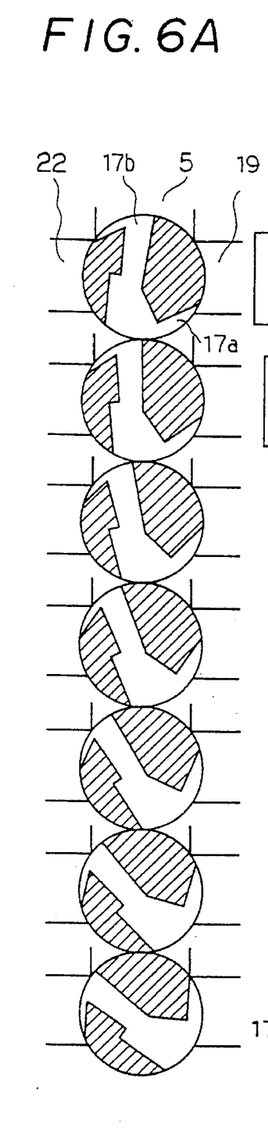
FIG. 6A is a cross-sectional view illustrating a valve body (rotor) of the flow quantity control valve.
Figure 6B:
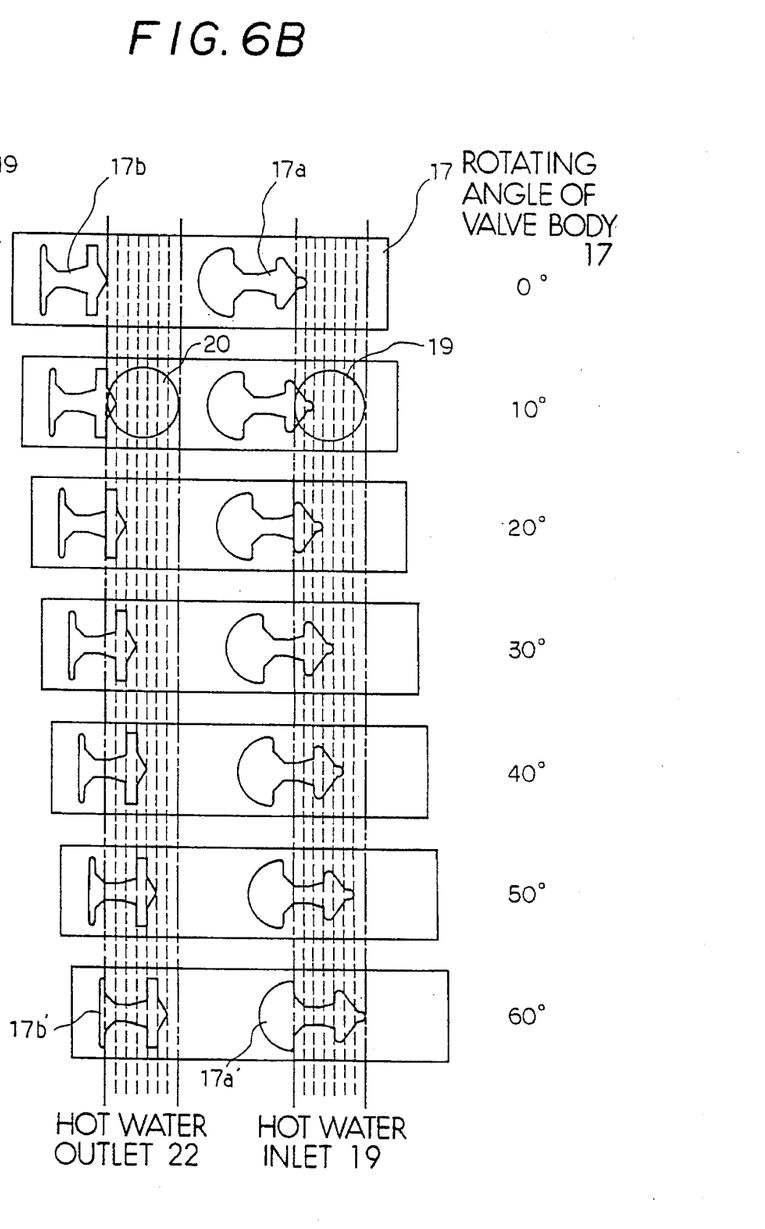
FIG. 6B is a developed view illustrating the valve body (rotor) of the flow quantity control valve.

Each opening area of inlet pipe 19, outlet pipe 22 and bypass circuit 5 is controlled by control passages 17a and 17b in accordance with the valve opening degree (rotating angle of valve body 17) so as to maintain a certain correlation as shown in the following Table. The shapes of control passages 17a and 17b and of valve body 17 are shown in FIG. 6B, which comply with the correlation in the Table.

TABLE

| VALVE OPERATION MODE | ROTATING ANGLE OF VALVE BODY 17 | HOT WATER INLET 19 (ENGINE 1) | HOT WATER OUTLET 22 (HEAT EXCHANGER 3) | BYPASS CIRCUIT 5 |
| --- | --- | --- | --- | --- |
| NON-HEATING OPERATION | 0° | MINIMUM OPENING (02 ROUND SHAPED HOLE) | FULL CLOSED | FULL OPEN OR NEARLY FULL OPEN |
| SMALL CAPACITY OPERATION | NOT MORE THAN 10° | SMALL OPENING (TWICE AS MUCH AS CONTROL PASSAGE 17b) | SMALL OPENING (HALF AS MUCH AS CONTROL PASSAGE 17a) | FULL OPEN OR NEARLY FULL OPEN |
| FROM SMALL CAPACITY TO | MORE THAN 10° AND LESS THAN | FROM SMALL OPENING TO | FROM SMALL OPENING TO LARGE | FULL OPEN OR NEARLY |

TABLE-continued

| VALVE OPERATION MODE | ROTATING ANGLE OF VALVE BODY 17 | HOT WATER INLET 19 (ENGINE 1) | HOT WATER OUTLET 22 (HEAT EXCHANGER 3) | BYPASS CIRCUIT 5 |
| --- | --- | --- | --- | --- |
| LARGE CAPACITY OPERATION | 60° | LARGE OPENING (SAME AS MUCH AS CONTROL PASSAGE 17a) | OPENING (SAME AS MUCH AS CONTROL PASSAGE 17a) | FULL OPEN |
| MAXIMUM HEATING CAPACITY OPERATION | 60° | FULL OPEN OR NEARLY FULL OPEN | FULL OPEN OR NEARLY FULL OPEN | FULL CLOSED OR NEARLY FULL CLOSED |

In FIG. 6B, portion 17á of control passage 17a, which does not face hot water inlet pipe 19, and portion 17b of control passage 17b, which constantly faces inlet of bypass circuit 5, are provided for reason of resin forming, but are not necessary for functional structure.

In the Table, the following feature should be noted.

(i) When the heating apparatus is in a non-heating operation (when a cooling unit equipped with the air-conditioner for the vehicle is in the maximum cooling operation), hot water inlet pipe 19 is not completely closed, but is set to a minimum opening area corresponding to a round-shaped hole having a diameter of 2 mm to keep hot water flowing from hot water inlet pipe 19 to the bypass circuit 5. Thus, noise of water hammer phenomenon by rapid stop of flowing hot water is prevented, and noise of flowing water is also prevented by setting the minimum opening area corresponding to a round-shaped hole having a diameter of 2 mm. Casting grains existing in hot water circuit are minute materials, diameter of which are not more than 1.0 mm. Thus, passage for the flow quantity control valve is certainly prevented from being choked up due to extraneous material such as casting grains.

(ii) When the heating apparatus is in a small capacity heating operation (when the opening degree of valve body 17 is equal to or less than 10°), each opening area of hot water inlet pipe 19 and hot water outlet pipe 22 is throttled (double throttling state). In this embodiment, full opening degree of valve body 17 is set to 60°. In FIG. 1, the double throttling state in small capacity operation is shown schematically, and an intermediate portion between throttling portions of hot water inlet pipe 19 and hot water outlet pipe 20, which is shown with "A", fully communicates with an inlet of bypass circuit 5, thereby making it possible to reduce differential pressure between the front and the back of heat exchanger 3.

As a result, it is possible to make smooth a variation of flow quantity of hot water (which finally corresponds to a variation of temperature of supply air to the passenger compartment) in accordance with a variation of valve opening degree (rotating angle of valve body 17) without specially providing a small opening area. Namely, control gain is reduced.

By reducing control gain, it is possible to control the temperature of supply air to the passenger compartment accurately and to prevent extraneous materials such as casting grain from choking up the passage for flowing quantity control valve certainly.

Also, when the opening area in the throttling portion of hot water inlet pipe 19 is set to twice as much as that of hot water outlet pipe 22, it gets easier to lead extraneous material such as casting grain to bypass circuit 5 by increasing the flow quantity in bypass passage from hot water inlet pipe 19 to bypass circuit 5, thereby preventing extraneous materials such as casting grain from choking up the passage for the flow quantity control valve more effectively.

(iii) Even when the heating apparatus is between small capacity heating operation and large capacity heating operation, it is also possible to control the temperature of the supply air to the passenger compartment accurately by reducing control gain with the double throttling. There is no possibility that the passage is choked up by extraneous materials such as casting grain, because the opening area in the throttling portion is increased. Thus, in this state, the opening area in the throttling portion of hot water inlet pipe 19 is set to the same as that of hot water outlet pipe 11.

In FIG. 4, heat exchanger 3 for heating includes inlet tank 3a for hot water at one end, outlet tank 3b for hot water at the other end and core portion 3c disposed between inlet tank 3a and outlet tank 3b. Core portion 3c includes a plurality of flat tubes 3d and corrugated fins 3e, which are disposed in parallel. Core portion 3c is configured as a one-way flow type value where hot water flows in only one direction from the inlet tank 3a to the outlet tank 3b.

Temperature distribution of supply air is shown with temperature range region T in FIG. 2. The highest temperature for supply air is around one end portion of heat exchanger (upper portion in FIG. 2), and temperature of supply air is lowered toward the other end portion (lower portion). Concretely, temperature of supply air around the lowest portion is 45° C., and temperature of supply air around the uppermost portion is 25° C., for example, rear foot air outlet 12 required for supplying high temperature air is disposed at one end portion (lower portion) of heat exchanger 3, and further front foot air outlet 11, defroster air outlet 10 and upper air outlet 9 are disposed in this order toward the other end (upper end) in accordance with the temperature distribution of supply air. Bypass air passage 8a is provided between inlet tank 3a of heat exchanger 3 and ventilating duct 8, and damper 8b is disposed in the air passage 8a. In the bi-level mode where conditioned air is supplied from the upper air outlet 9, front foot air outlet 11 and rear foot air outlet 12, the damper 8b is open so that cooling air is directly supplied to the lower side of heat exchanger 3. Temperature difference between air coming from upper air outlet 9 and air coming from foot air outlets 11 and 12 are prevented from becoming excessively large.

In FIG. 4, second hot water outlet pipe 22 of flowing quantity control valve 4 is watertightly and detachably connected to one end of connecting pipe 30, which is made of rigid body such as metal (ex. aluminum) or resin, by joint 31 using a sealing material such as an O-ring. The other end of connecting pipe 30 is also watertightly and detachably connected to hot water inlet 3f, which is provided at one end of inlet tank 3a of heat exchanger 3 in a longitudinal direction, by joint 32 using a sealing material.

Second hot water inlet pipe 21 is directly, watertightly and detachably connected to hot water outlet 3g, which is provided at one end of outlet tank 3b of heat exchanger 3 in a longitudinal direction, by joint 33 using a sealing material. Joint 33 is rotatable so that a rotating position of the flow quantity control valve 4 is controlled in relation to the position of heat exchanger 3. Thus, it is possible to expand the design freedom of heat exchanger 3.

As described above, the actuating mechanism for actuating valve body 17 including flow quantity control valve 4, bypass circuit 5, differential pressure valve 6, servomotor 16 and so on is configured as an unit and is further attached to heat exchanger 3 as an unit beforehand. Thus, it is possible to assemble the unit structure into ventilating duct (heater case) 8, thereby improving assembling ability and making the shape of heat exchanger portion smaller.

In this embodiment, when the air conditioner is mounted on the vehicle, connecting work for hot water pipes is simplified. As shown in FIG. 3, first hot water inlet pipe 19 to which hot water flows from engine 1 and first hot water outlet pipe 20 which returns hot water to engine 1 are disposed in parallel and extend in the same direction.

Concretely, the valve housing 17 provided with the first hot water inlet pipe 19 and the hot water outlet pipe 20 is disposed in an axial (longitudinal) direction of outlet tank 3b of heat exchanger 3, and the first hot water inlet pipe 19 and the hot water outlet pipe 20 extends in parallel and in a vertical direction with the axial direction of outlet tank 3b.

In FIG. 7, the air conditioner is shown mounted on the vehicle. Numeral 34 indicates an engine room, numeral 35 indicates a passenger compartment, and engine room 34 and passenger compartment 35 are divided by partition plate (fire wall) 36. Heat exchanger 3 and the flow quantity control valve 4 are disposed in passenger compartment 35. Hot water inlet pipe 19 and outlet pipe 20 of the flow quantity control valve 4 extend into engine room 34 passing through partition plate 36.

Accordingly, it is possible to connect easily the hot water pipe at the side of engine 1 with hot water inlet pipe 19 and outlet pipe 20 within engine room 34. In FIG. 7, flow quantity control valve 4 is shown in such a manner to be positioned above the heat exchanger 3 for the sake of convenience; however, it is preferable that the flow quantity control valve 4 be positioned to the extent of the vertical length of heat exchanger 3 as shown in FIGS. 3 and 4.

In the air conditioner for the vehicle, generally, heat exchanger 3 is disposed in passenger compartment 35, and the flow quantity control valve 4 is disposed in engine room 1. According to such a layout, connecting work for piping should be done in the narrow passenger compartment in addition to the connecting work for piping in engine room 34; however, according to this embodiment, connecting work for the hot water pipes of the heating apparatus can be done only in the engine room 34.

In the air conditioner shown in FIG. 7, coolant evaporator 37 for cooling is disposed at a lower position, and the heat exchanger 3 for heating is disposed at an upper position than coolant evaporator 37. Coolant evaporator 37 and heat exchanger 3 are disposed in an approximately horizontal direction. Air ventilated by a ventilating device (not shown) passes through evaporator 37 from the bottom to the top thereof, and the temperature of ventilating air is controlled by controlling hot water flow quantity with the flow quantity control valve 4. Then, conditioned air is supplied from supply air portion 41 (which includes air outlets 9–11 shown in FIG. 2) to the passenger compartment passing through outlet mode switching portion 40 in which a cylindrical rotary door is incorporated.

In FIG. 7, inlet pipe 37a of evaporator 37 and outlet pipe 37b of evaporator 37 are disposed so as to pass through partition plate 36 and are connected to a coolant passage of evaporator 37 passing through expansion valve 38 for reducing the pressure of the coolant. Sealing material (grommet) 39 seals up the hole portions of partition plate 39, through which pipes 37a and 37b pass.

An operation of the embodiment will be described. When the heating apparatus is in an operation of the maximum heating capacity, valve body 17 of the flow quantity control valve 4 is rotated to the maximum opening degree (concretely, valve opening degree is 60° in FIG. 6) by servomotor 16 or a manually operated mechanism.

Thereby, control passages 17a and 17b of the valve body 17 communicate with the hot water inlet pipe 19 and the hot water outlet pipe 22 at the full opening area, respectively. These pipes 19 and 22 are fully open. In the meantime, the bypass circuit 5 is slightly open to the control passage 17b. Bypass circuit 5 is nearly full-closed.

As a result, most of hot water coming from engine 1 flows in heat exchanger 3 and a small amount of hot water flows in bypass circuit 5. Thereby, heat exchanger 3 operates at the maximum heating capacity. At that time, there is no possibility that the flow passage is chocked-up by extraneous material such as casting grain. Further, flow noise is not generated because the hot water inlet pipe 19 communicates with hot water outlet pipe 22 at the full opening area.

Further, since bypass circuit 5 is nearly fully-closed, it is possible to secure enough quantity of circulating water for a radiator (not shown) for engine 1.

Next, when the heating apparatus is in the non-heating operation (when the cooling unit equipped with the air conditioner for the vehicle, is in the maximum cooling operation), valve body 17 of the flow quantity control valve 4 is rotated to the zero opening degree (concretely, valve opening degree is 0° in FIG. 6) by servomotor 16 or a manually operated mechanism. At the position of the zero opening degree, control passage 17b of valve body 17 fully communicates with the inlet of bypass passage 5, thereby fully-opening bypass passage 5 and fully-closing hot water outlet pipe 22.

In the meantime, only a portion of control passage 17a, which extends toward the right side, communicates with the hot water inlet pipe 19 as shown in the top of FIG. 6B. Thus, hot water inlet pipe 19 is not fully-closed, and the minimum opening area corresponding to a round-shaped hole having a diameter of 2.0 mm is set. Thus, it is possible to keep hot water flowing from the hot water inlet pipe 19 to the bypass circuit 5 by the position of valve body 17. As a result, noise of water hammer phenomenon by rapid stop of flowing hot water is prevented, and noise of flowing water is also prevented from being caused by setting the minimum opening area corresponding to a round-shaped hole having a diameter which is equal to or more than 2.0 mm. Casting grain existing in hot water circuit are generally minute materials, diameter of which are not more than 1.0 mm. Therefore, it is possible to certainly prevent extraneous materials such as casting grain from choking-up the passage of flow quantity control valve by setting the size of the minimum opening area.

Further, it is possible to secure enough quantity of circulating water for a radiator (not shown) for engine 1 by setting the opening area of hot water inlet pipe 19 to the minimum opening area corresponding to a round-shaped hole having a diameter of 2.0 mm.

Next, when the heating apparatus is in the small capacity operation, valve body 17 is rotated to the valve opening of 10° or less, which is shown in FIG. 6B, the control passages 17a and 17b communicate with the hot water inlet pipe 19 and the hot water outlet pipe 22, respectively, in small opening area. Thus, both opening areas of the hot water inlet pipe 19 and the hot water outlet pipe 22 are throttled (double throttling state). The double throttling state in the small capacity operation is schematically shown in FIG. 1. The intermediate portion A between the throttling portions of hot water inlet pipe 19 and hot water outlet pipe 22 communicates with bypass circuit 5, which is in a full open position, in a large opening area, thereby pressure in the intermediate portion A is reduced.

As a result, differential pressure between the front and the back of heat exchanger 3 is made sufficiently small, and variation in hot water flow quantity (which finally corresponds to variation in temperature of supply air to the passenger compartment) according to the valve opening degree (rotating angle of valve body 17) can be made smooth without providing a specific small opening area. That is to say, control gain of temperature of supply air can be reduced.

By reducing the control gain, it is possible to control the temperature of supply air to the passenger compartment accurately, and it is also possible to sufficiently prevent extraneous material such as casting grain from choking up the fluid passage of the flow quantity control valve, because it is not necessary to set opening areas of hot water inlet pipe 19 and hot water outlet pipe 22 to a specific small opening area.

Further, by setting the opening area in the throttling portion of the hot water inlet pipe 19 to twice as much as that of the hot water outlet pipe 22, it is possible to increase the flow quantity bypassing from hot water inlet pipe 19 to bypass circuit 5 so that extraneous material such as casting grain can flow to bypass circuit 5 easily, thereby extraneous material staying in the control passage 17b forming the throttling portion of hot water outlet pipe 22 is washed away by the bypassing flow. Thus, it is possible more effectively to prevent extraneous material such as casting grain from choking-up the fluid passage.

When the heating apparatus is between small capacity operation and large capacity operation, valve body 17 is rotated to the extent of the valve opening greater than 10° and less than 60°. Even when the valve body 17 is in such a position, it is possible to reduce the control gain and control temperature of the supply air to the passenger compartment by the double throttling. Further, there is no possibility that extraneous material such as casting grain will choke-up the fluid passage, because the opening area of throttling portion is increased. Therefore, in such an operation, the opening area in the throttling portion of hot water inlet pipe 19 is set to same as that of the hot water outlet pipe 22.

Supplying pressure of hot water from engine 1 varies greatly in accordance with the running condition of the vehicle, because rotational speed of engine 1 which supplies hot water to the air conditioner for the vehicle varies greatly in accordance with the running condition of the vehicle. It may give a great influence on hot water flow quantity control by flow quantity control valve 4 and finally on temperature control of supply air; however, in this embodiment, variation in flow quantity of hot water due to the variation in supplying pressure of hot water from engine 1 is overcome by providing differential pressure valve 6 in bypass circuit 5.

That is to say, when the supplying pressure of hot water from engine 1 rises, the differential pressure between the front and the back of the differential pressure valve 6 becomes higher than a predetermined pressure. Then, differential pressure valve 6 moves toward the left direction in FIG. 5 and opens. A gap (opening area of round-shaped hole 27) between the differential pressure valve 6 and the partition wall (valve seat) 27 is controlled in accordance with the differential pressure, thereby differential pressure valve 6 maintains the differential pressure between hot water inlet pipe 19 and hot water outlet pipe 22 at a constant value.

Therefore, pressure of hot water acting on the heat exchanger 3 can be maintained at a constant value in spite of the variation in supplying pressure of hot water from engine 1, and the variation in flow quantity of hot water due to the variation in the supplying pressure of hot water from engine 1 can be prevented.

Hole 6C which keeps bypass circuit 5 open constantly is provided in differential pressure valve 6. Therefore, hot water constantly flows in bypass passage 5 irrespective of rotational speed of engine 1, and even when supplying pressure of hot water is reduced during an idling condition of engine 1, the control gain can be reduced.

The present invention is not limited to the above first embodiment, various types of embodiments or modifications will be described as below.

Figure 8:
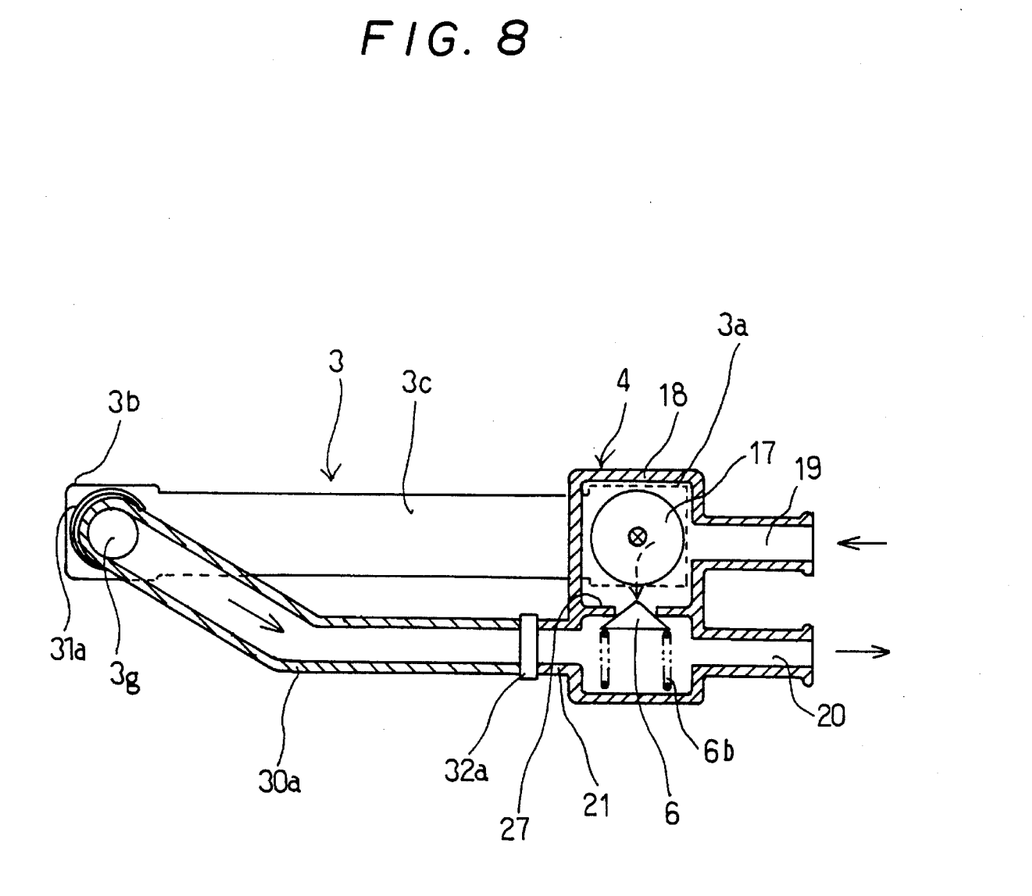
FIG. 8 is a partial sectional view showing the flow quantity control valve and the heat exchanger assembled as a unit, according to another embodiment of the present invention.

In the first embodiment, the flow quantity control valve 4 is disposed in outlet tank 3b of the heat exchanger 3; however, as shown in FIG. 8, the flow quantity control valve 4 can be disposed in the hot water inlet tank 3a. In FIG. 8, one end of connecting pipe 30a is connected to the hot water outlet 3g of outlet tank 3b by joint 31a, and the other end of the connecting pipe 30a is connected to hot water inlet pipe 21 of the flow quantity control valve 4 by joint 32a. Hot water outlet pipe 22 (not shown in FIG. 8) of the flow quantity control valve 4 is directly connected to hot water inlet 3f (not shown in FIG. 8) of the hot water inlet tank 3a.

That is to say, the flow quantity control valve 4 can be disposed in either of the inlet tank 3a or the outlet tank 3b of the heat exchanger 3.

Figure 9:
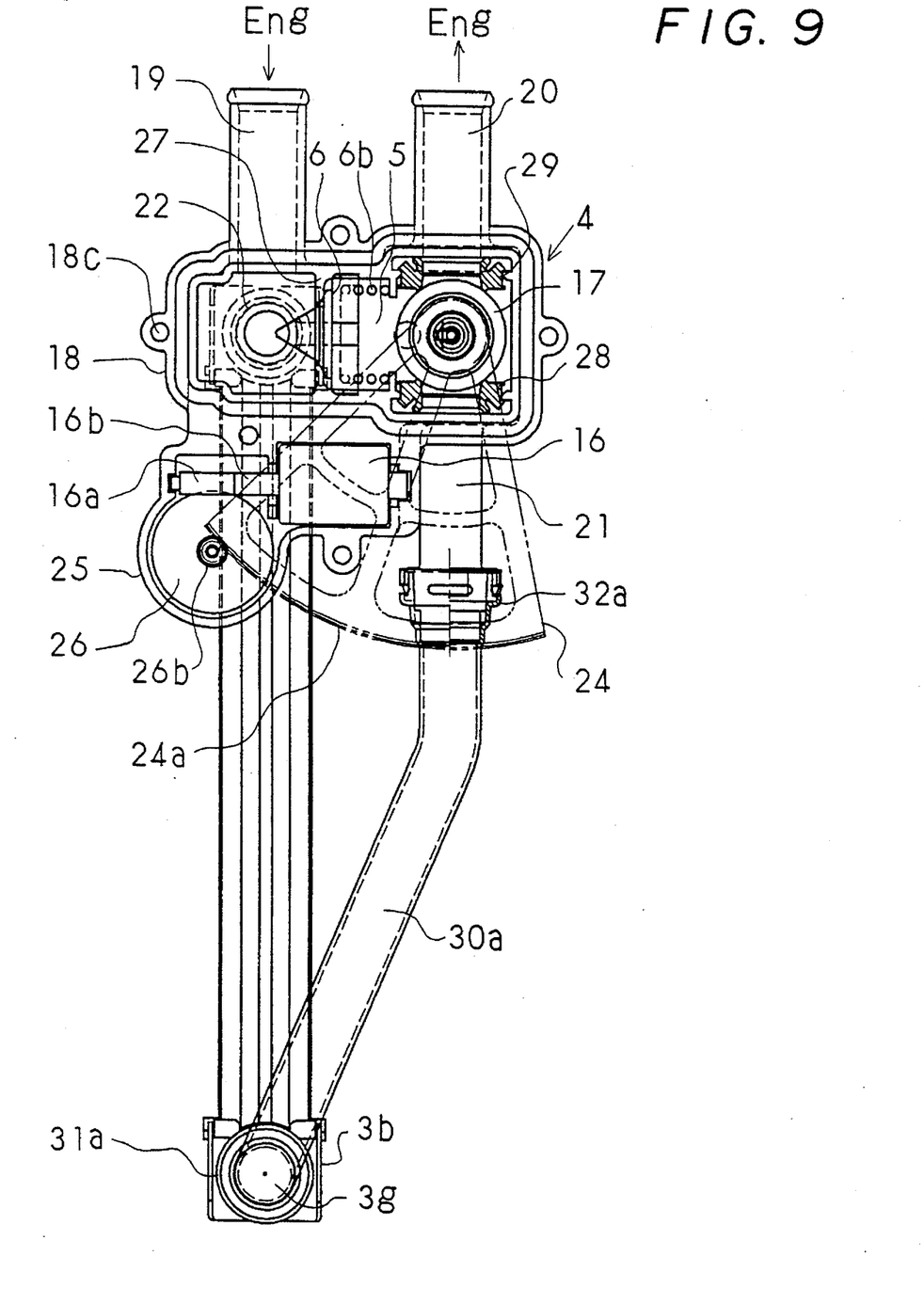
FIG. 9 is a partial sectional side view shown with an upper cover of the flow quantity control valve removed according to yet another embodiment of the present embodiment.
Figure 10:
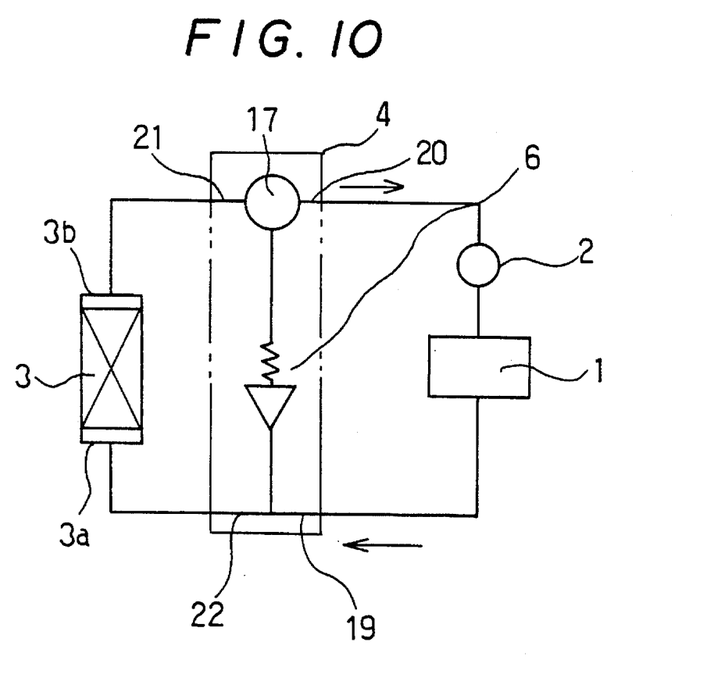
FIG. 10 is a schematic view illustrating a hot water circuit of the embodiment shown in FIG. 9.

In the first embodiment, valve body 17 is disposed at the side of the hot water inlet in inlet tank 3b of the heat exchanger 3 and the hot water controlled in flow quantity by valve body 17 is led to inlet tank 3b of the heat exchanger 3; however, as shown in FIG. 9, valve body 17 of the flow quantity control valve 4 can be disposed at a side of hot water outlet of the heat exchanger 3.

In FIG. 9, one end of the connecting pipe 30a is connected to the hot water outlet 3g of the outlet tank 3b by joint 31a, and the other end of the connecting pipe 30a is connected to the hot water inlet pipe 21 by joint 32a. Flow quantity of the hot water flowing from the hot water inlet pipe 21 to hot water outlet pipe 20 and the flow quantity of hot water flowing from the bypass circuit 5 to the hot water outlet pipe 20 are controlled by valve body 17. In this embodiment, the hot water outlet pipe 22 is provided at an upstream side of differential pressure valve 6 in bypass circuit 5, and the hot water outlet pipe 22 is connected to the hot water inlet 3f (not shown in FIG. 9) of inlet tank 3a of heat exchanger 3. FIG. 9 illustrates a hot water circuit in this embodiment.

Figure 11:
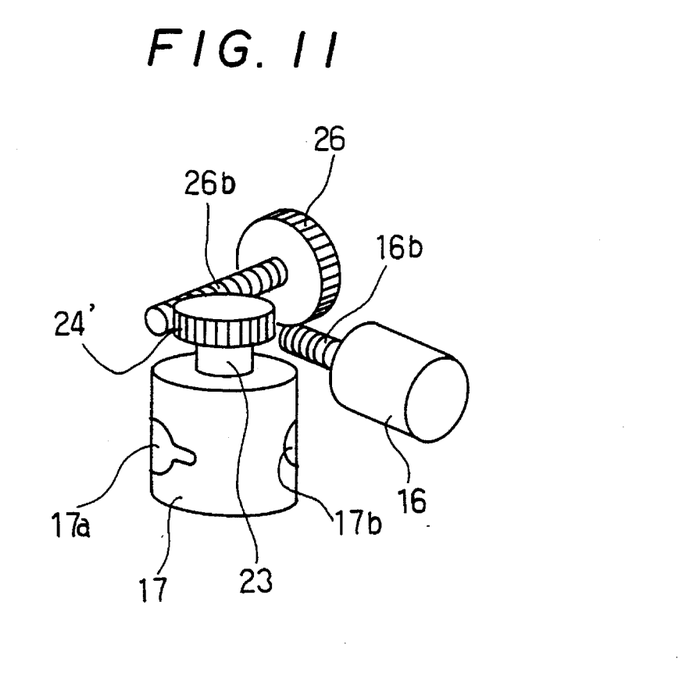
FIG. 11 is a perspective view illustrating a valve body actuating mechanism according to still another embodiment of the invention.

In the first embodiment, a fan-shaped gear 24 is used; however, as shown in FIG. 11, it is possible to provide a two steps worm gear mechanism including worm gears 16b and 26b and flat gears 24' and 26 between servomotor 16 and valve body 17 instead of the fan-shaped gear 24, thereby making the gear portion smaller but providing the same speed reducing ratio.

Next, modifications of the hot water circuit will be described with respect to FIGS. 12A–12D.

Figure 12A:
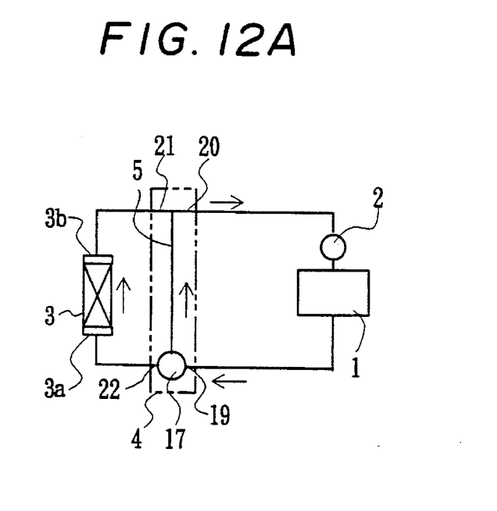
FIG. 12A is a modification of hot water circuit.

According to the modification shown in FIG. 12A, the differential pressure valve 6 in bypass circuit 5 is abolished.

Figure 12B:
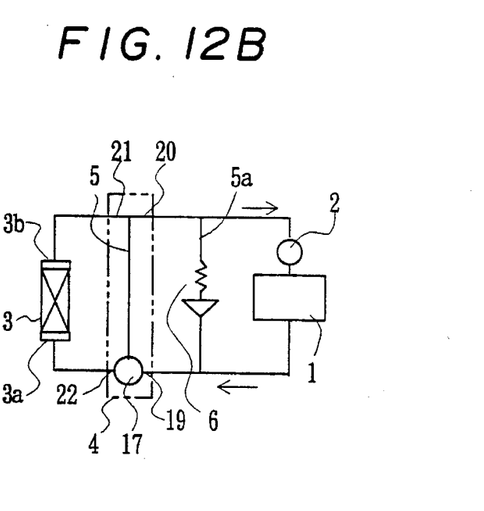
FIG. 12B is another modification of hot water circuit.

According to the modification shown in FIG. 12B, a second bypass circuit 5a which is not open and closed by the flow quantity control valve 4 is provided in addition to the first bypass circuit 5 which is open and closed by the flow quantity control valve 4. The second bypass circuit 5a constantly communicates with engine 1 in parallel, and the differential pressure valve 6 is disposed in the second bypass circuit 5a.

Figure 12C:
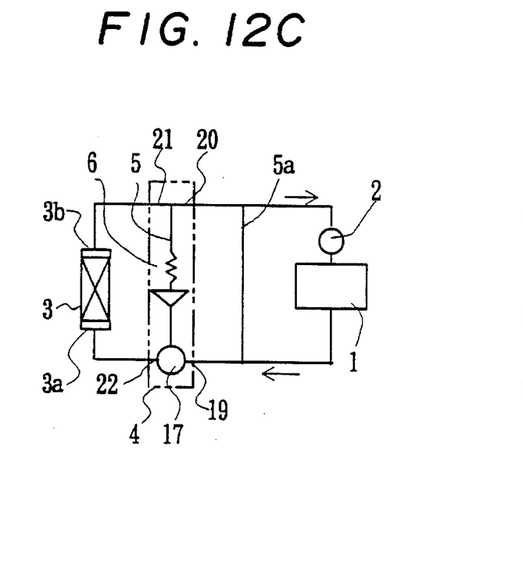
FIG. 12C is yet another modification of hot water circuit.

According to the modification shown in FIG. 12C, the second bypass circuit 5a which is not open and closed by the flow quantity control valve 4 is provided in addition to the first bypass circuit 5 in which the differential pressure valve 6 is disposed. The second bypass circuit 5a constantly communicates with engine 1 in parallel.

Figure 12D:
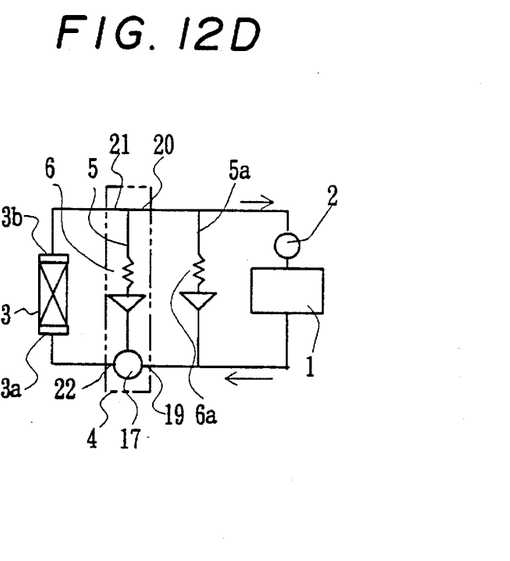
FIG. 12D is a further modification of hot water circuit.

According to the modification shown in FIG. 12D, second bypass circuit 5a which is not open and closed by flow quantity control valve 4 is provided in addition to the first bypass circuit 5 in which the differential pressure valve 6 is disposed. Another differential pressure valve 6a is provided in the second bypass circuit 5a.

The embodiments shown in FIGS. 12A–12D function as well as the first embodiment does, and it is possible to reduce control gain of temperature control and prevent extraneous material such as casting grain from choking up the fluid passage.

The present invention has been described in connection with what are presently considered to be the most practical and preferred embodiments. However, the invention is not meant to be limited to the disclosed embodiments, but rather is intended to include all modifications and alternative arrangements included within the spirit and scope of the appended claims.

What is claimed is:

1. A hot water type heating apparatus for a vehicle having a water cooled engine, said heating apparatus comprising:

a heat exchanger constructed and arranged to heat a passenger compartment of said vehicle by heat exchanging air with hot water supplied from the engine, said heat exchanger having a hot water inlet portion and a hot water outlet portion; and a flow quantity control valve for controlling a flow quantity of said hot water supplied from the engine to said heat exchanger, said flow quantity control valve being integrated with said heat exchanger as a unit and being in fluid communication therewith, said flow quantity control valve comprising:

a valve housing constructed and arranged to be coupled between said heat exchanger and the engine;

a first hot water inlet pipe constructed and arranged such that one end is coupled to said valve housing and another end may be coupled to the engine such that hot water from the engine may flow into said first hot water inlet pipe;

a first hot water outlet pipe constructed and arranged to be fluidly connected between said heat exchanger and the engine, one end of said first hot water outlet pipe being connected to said valve housing and the other end being connectable to the engine, said first hot water outlet pipe returning said hot water to the engine;

a second hot water outlet pipe constructed and arranged such that one end thereof is coupled to said valve housing and another end thereof being coupled to said heat exchanger, said second hot water outlet pipe directing said hot water flowing from said first hot water inlet pipe to said hot water inlet portion of said heat exchanger;

a second hot water inlet pipe connected between said valve housing and said heat exchanger, which directs said hot water from said hot water outlet portion of said heat exchanger into said valve housing;

a bypass circuit defined in said valve housing which selectively connects said hot water from first hot water inlet pipe directly to said first hot water outlet pipe; and a valve body disposed in said valve housing between said first hot water inlet pipe and said second hot water outlet pipe and in fluid communication with said bypass circuit, said valve body being constructed and arranged to adjust an opening area between said first hot water inlet pipe and said second hot water outlet pipe while controlling flow through said bypass circuit.

2. A heating apparatus according to claim 1, wherein said flow quantity control valve integrated with said heat exchanger is constructed and arranged to be disposed in said passenger compartment, each end of said first hot water inlet pipe and said first hot water outlet pipe being constructed and arranged to extend into an engine room where said engine is disposed.

3. A heating apparatus according to claim 1, further comprising:

a pressure valve disposed in said bypass circuit, said pressure valve being constructed and arranged to open when pressure of said hot water supplied from said engine increases so that a difference in pressure between pressure in said first hot water inlet pipe and pressure in said first hot water outlet pipe is kept in a constant valve.

4. A heating apparatus according to claim 1, wherein said valve body is a rotor which is rotatably supported in said valve housing, said rotor being constructed and arranged to adjust said opening area between said first hot water inlet pipe and said second hot water outlet pipe upon rotation thereof.

5. A heating apparatus according to claim 1, wherein said valve body is connected between said bypass circuit and said first hot water inlet pipe so as to adjust an opening area between said first hot water inlet pipe and said bypass circuit.

6. A heating apparatus according to claim 5, wherein said valve body is constructed and arranged such that said opening area between said first hot water inlet pipe and said second hot water outlet pipe has a correlation with said opening area between said first hot water inlet pipe and said bypass circuit.

7. A heating apparatus according to claim 1, further comprising:

an electrical actuator outlet to said valve body for actuating said valve body, said actuator being disposed in said valve housing.

8. A heating apparatus according to claim 7, wherein said electrical actuator includes a servomotor and a gear mechanism which transfers rotation of said servomotor to said valve body.

9. A heating apparatus according to claim 8, wherein said gear mechanism includes a fan-shaped gear disposed outside of said valve housing, a portion of said fan-shaped gear being connected to a shaft of said valve body.

10. A heating apparatus according to claim 9, wherein said fan-shaped gear is constructed and arranged to be operated manually.

11. A heating apparatus according to claim 1, wherein said heat exchanger includes an inlet tank constructed and arranged to receive said hot water directed from said second hot water outlet pipe, an outlet tank constructed and arranged to return said hot water to said second hot water inlet pipe, and a core portion between said inlet tank and said outlet tank which allows hot water to flow in only one direction from said inlet tank to said outlet tank, said flow quantity control valve being disposed adjacent to one of said inlet tank.

12. A heating apparatus according to claim 11, wherein said flow quantity control valve is disposed in an axial direction of one of said inlet tank and said outlet tank, and said first to water inlet pipe and said first hot water outlet pipe extending in a parallel and in a vertical direction with respect to said axial direction.

13. A heating apparatus according to claim 11, wherein said second hot water outlet pipe is connected to said inlet tank and said second hot water inlet pipe is connected to said outlet tank.

14. A heating apparatus according to claim 13, further comprising:

a connecting pipe, made of a rigid body, connecting said second hot water outlet pipe with said inlet tank.

15. A heating apparatus according to claim 1, wherein said second hot water inlet pipe is rotatably connected to said heat exchanger so that a rotating position of said valve body is controlled in relation to said heat exchanger.

16. A hot water type heating apparatus for a vehicle having a water cooled engine, said heating apparatus comprising:

a heat exchanger constructed and arranged to heat a passenger compartment of said vehicle by heat exchanging air with hot water supplied from the engine, said heat exchanger having a hot water inlet portion and a hot water outlet portion; and a flow quantity control valve for controlling a flow quantity of said hot water supplied from the engine to said heat exchanger, said flow quantity control valve being integrated with said heat exchanger as a unit and being in fluid communication therewith, said flow quantity control valve comprising:

a valve housing constructed and arranged to be coupled between said heat exchanger and the engine;

a first hot water inlet pipe constructed and arranged such that one end is coupled to said valve housing and another end may be coupled to the engine such that hot water from the engine may flow into said first hot water inlet pipe;

a first hot water outlet pipe constructed and arranged to be fluidly connected between said heat exchanger and the engine, one end of said first hot water outlet pipe being connected to said valve housing and the other end being connectable to the engine, said first water to the engine;

a second hot water outlet pipe, one end thereof being coupled to said valve housing and another end thereof being coupled to said heat exchanger, said second hot water outlet pipe directing said hot water flowing from said first hot water inlet pipe to said hot water inlet portion of said heat exchanger;

a second hot water inlet pipe connected between said valve housing and said heat exchanger, which directs said hot water from said hot water outlet portion of said heat exchanger into said valve housing;

a bypass circuit defined in said valve housing which selectively connects said hot water from said first hot water inlet pipe directly to said first hot water outlet pipe; and a valve body disposed in said valve housing between said first hot water inlet pipe and said second hot water outlet pipe and in fluid communication with said bypass circuit, said valve body being constructed and arranged to adjust an opening area between said first hot water inlet pipe and said second hot water outlet pipe while controlling flow through said bypass circuit, wherein said heat exchanger includes an inlet tank constructed and arranged to receive said hot water directed from said second hot water outlet pipe, an outlet tank constructed and arranged to return said hot water to said second hot water inlet pipe, and a core portion between said inlet tank and said outlet tank which allows hot water to flow in only one direction from said inlet tank to said outlet tank, said flow quantity control valve being disposed adjacent to one of said inlet tank and said outlet tank and mounted and in an axial direction of one of said inlet tank and said outlet tank, and said first hot water inlet pipe and said first hot water outlet pipe extending in a parallel and in a vertical direction with respect to said axial direction, said flow quantity control valve and said heat exchanger being constructed and arranged to be disposed in said passenger compartment, and each end of said first hot water inlet pipe and said first hot water outlet pipe being constructed and arranged to extend into an engine room where the engine is disposed.

17. A heating apparatus according to claim 16, further comprising:

a pressure valve disposed in said bypass circuit, said pressure valve being constructed and arranged to open when pressure of said hot water supplied from said engine increases so that a difference in pressure between pressure in said first hot water inlet pipe and pressure in said first hot water outlet pipe is kept in a constant value.

18. A heating apparatus according to claim 16, wherein said valve body is a rotor which is rotatably supported in said valve housing, said rotor being constructed and arranged to adjust said opening area between said first hot water inlet pipe and said second hot water outlet pipe upon rotation thereof.

19. A heating apparatus according to claim 16, wherein said valve body is connected between said bypass circuit and said first hot water inlet pipe so as to adjust an opening area between said first hot water inlet pipe and said bypass circuit.

20. A heating apparatus according to claim 19, wherein said valve body is constructed and arranged such as said opening area between said first hot water inlet pipe and said second hot water outlet pipe has a correlation with said opening area between said first hot water inlet pipe and said bypass circuit.

21. A heating apparatus according to claim 16, further comprising:

an electrical actuator coupled to said valve body for actuating said valve body, said actuator being disposed in said valve housing.

22. A heating apparatus according to claim 21, wherein said electrical actuator includes a servomotor and a gear mechanism which transfers rotation of said servomotor to said valve body.

23. A heating apparatus according to claim 22, wherein said gear mechanism includes a fan-shaped gear disposed outside of said valve housing, a portion of said fan-shaped gear being connected to a shaft of said valve body.

24. A heating apparatus according to claim 23, wherein said fan-shaped gear is constructed and arranged to be operated manually.

* * * * *